(12) United States Patent
Ungetheim et al.

(10) Patent No.: US 10,106,170 B2
(45) Date of Patent: Oct. 23, 2018

(54) VEHICLE RAMP CONTROL SYSTEM

(71) Applicant: VANTAGE MOBILITY INTERNATIONAL, LLC, Phoenix, AZ (US)

(72) Inventors: Steven P. Ungetheim, Phoenix, AZ (US); Mark C. Miller, Phoenix, AZ (US)

(73) Assignee: Vantage Mobility International, LLC, Phoenix, AZ (US)

( * ) Notice: Subject to any disclaimer, the term of this patent is extended or adjusted under 35 U.S.C. 154(b) by 102 days.

(21) Appl. No.: 15/244,278

(22) Filed: Aug. 23, 2016

(65) Prior Publication Data

US 2017/0057519 A1 Mar. 2, 2017

Related U.S. Application Data

(60) Provisional application No. 62/212,327, filed on Aug. 31, 2015.

(51) Int. Cl.
*B60W 50/02* (2012.01)
*B60W 10/30* (2006.01)
*B60W 10/22* (2006.01)

(52) U.S. Cl.
CPC ........ *B60W 50/0205* (2013.01); *B60W 10/22* (2013.01); *B60W 10/30* (2013.01); *B60W 2300/50* (2013.01); *B60W 2510/30* (2013.01); *B60W 2710/22* (2013.01); *B60W 2710/30* (2013.01)

(58) Field of Classification Search
CPC .. B60W 50/0205; B60W 10/22; B60W 10/30; B60W 2300/50; B60W 2510/30; B60W 2710/30
See application file for complete search history.

(56) References Cited

U.S. PATENT DOCUMENTS

| 5,359,308 A | 10/1994 | Sun et al. |
| 6,009,355 A * | 12/1999 | Obradovich ....... B60G 17/0195 340/815.4 |
| 7,684,915 B1 * | 3/2010 | Dailey .................. A61G 3/061 414/462 |
| 2003/0007851 A1 | 1/2003 | Heigl et al. |
| 2011/0008141 A1 | 1/2011 | Goodrich et al. |

OTHER PUBLICATIONS

PCT International Search Report and Written Opinion, corresponding to PCT Application No. PCT/US2016/048344, dated Dec. 23, 2016, 11 pages.

* cited by examiner

*Primary Examiner* — Yonel Beaulieu
*Assistant Examiner* — Martin A Weeks
(74) *Attorney, Agent, or Firm* — Fennemore Craig, P.C.

(57) ABSTRACT

A vehicle ramp control system may include a system controller configured to interface with a power ramp system for a vehicle and with an OEM vehicle control system. A service tool configured to interface with the system controller is programmed to exchange with the system controller data relating to at least one operational aspect of the power ramp system. A diagnostic tool configured to interface with the system controller is programmed to exchange with the system controller data relating to at least one diagnostic aspect of the power ramp system. A preventative maintenance indicator operatively associated with the system controller is activated by the system controller when a preventative maintenance operation is required.

7 Claims, 5 Drawing Sheets

VEHICLE RAMP CONTROL SYSTEM

CROSS-REFERENCE TO RELATED APPLICATION

This application claims the benefit of U.S. Provisional Patent Application No. 62/212,327, filed on Aug. 31, 2015, which is hereby incorporated herein by reference for all that it discloses.

TECHNICAL FIELD

The present invention relates to control systems in general and more particularly to methods and systems for controlling the operation of power-deployable vehicle ramps.

BACKGROUND

Ramp systems for vehicles are known in the art and are commonly provided as modifications to OEM vehicles, such as minivans. The ramp systems allow persons requiring wheelchairs to readily enter such vehicles, either to drive the vehicles themselves or to ride along. While manually-operated access ramps are known in the art and widely used, power-deployable vehicle ramps are becoming increasingly popular.

SUMMARY OF THE INVENTION

One embodiment of a vehicle ramp control system may include a system controller configured to interface with a power ramp system for a vehicle and with an OEM vehicle control system associated with the vehicle. A service tool configured to interface with the system controller is programmed to exchange with the system controller data relating to at least one operational aspect of the power ramp system. A diagnostic tool configured to interface with the system controller is programmed to exchange with the system controller data relating to at least one diagnostic aspect of the power ramp system. A preventative maintenance indicator operatively associated with the system controller is activated by the system controller when a preventative maintenance operation is required.

Also disclosed is a vehicle that may include a ramp mounted to the vehicle adjacent a power sliding door provided on the vehicle so that the ramp may be moved between a deployed position and a retracted position. A power ramp control system operatively associated with the ramp moves the ramp between the deployed and retracted positions. A system controller operatively associated with the power ramp system and an OEM vehicle control system operates the power ramp system in conjunction with at least one system controlled by the OEM vehicle control system. A preventative maintenance indicator mounted on a dashboard of the vehicle and operatively associated with the system controller is activated when the system controller determines that a preventative maintenance operation is required.

A method of operating a power ramp system on a vehicle to deploy and retract a ramp may involve: Sensing a 'door open' command issued by a vehicle operator; opening a sliding door on the vehicle in response to the 'door open' command; determining when the sliding door is in a fully opened position; and activating the power ramp system to deploy the ramp when the door is in a fully opened position, the opening, determining, and activating steps occurring without additional commands by the vehicle operator.

Also disclosed is a vehicle ramp control system that includes a system controller configured to interface with a power ramp system for a vehicle and also with an OEM vehicle control system associated with the vehicle. The system controller is programmed to operate the power ramp system in conjunction with at least one system controlled by the OEM vehicle control system. A preventative maintenance indicator operatively associated with the system controller is activated by the system controller when a preventative maintenance operation is required.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
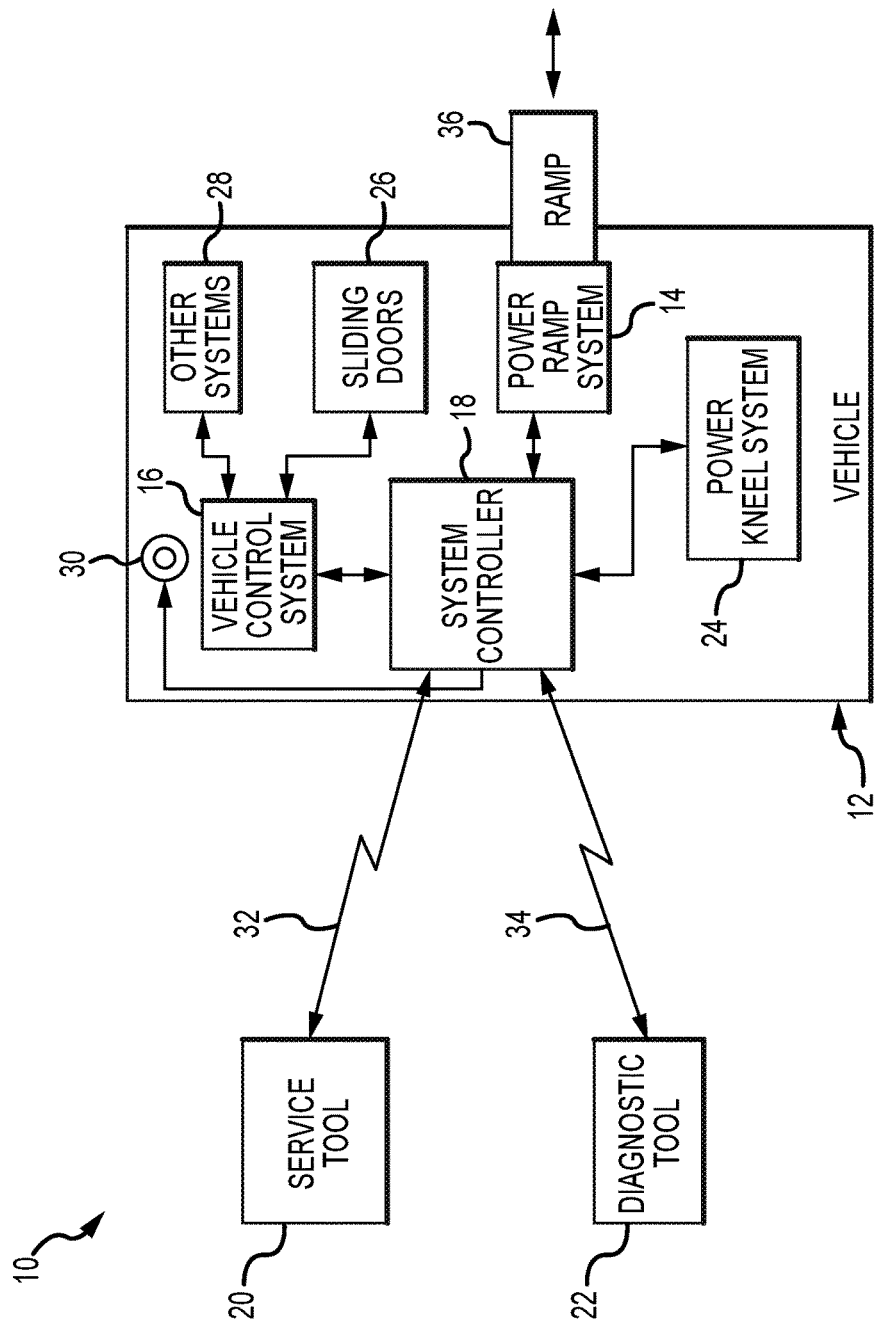
FIG. 1 is a schematic block diagram of one embodiment of the vehicle ramp control system as it may be used to control a power ramp system provided on a vehicle.

One embodiment of a vehicle ramp control system 10 according to the teachings of the present invention is illustrated in FIG. 1 and is shown and described herein as it may be used in conjunction with a vehicle 12 provided with a power ramp system 14 for deploying a vehicle ramp 36. The vehicle ramp control system 10 may be operatively connected to the power ramp system 14 and to an existing or OEM vehicle control system 16. As will be described in greater detail herein, the vehicle ramp control system 10 controls and operates the power ramp system 14 in conjunction with various other systems and aspects of vehicle 12 under the control of the OEM vehicle control system 16, thereby allowing for the integrated, streamlined control of the power ramp system 14.

In one embodiment, the vehicle ramp control system 10 may comprise a system controller 18, a service tool 20, and a diagnostic tool 22. Vehicle ramp control system 10 may also comprise a preventative maintenance indicator 30. The system controller 18 may be operatively connected to the power ramp system 14 and, optionally, to a power kneel system 24 that may be provided on vehicle 12. System controller 18 may also be operatively connected to the vehicle control system 16, which may comprise an OEM component of vehicle 12. As is known, vehicle control system 16 may be used to control any of a wide range of vehicle systems and devices provided by the vehicle manufacturer.

The vehicle ramp control system 10 may also comprise service tool 20. Service tool 20 may be operatively connected to the system controller 18 from time-to-time to allow a service technician (not shown) to access the system controller 18. In one embodiment, service tool 20 may comprise a software program configured to operate on a general purpose programmable computer, such as a laptop PC. Alternatively, service tool 20 may comprise a dedicated or custom system designed specifically for use with the system controller 18.

Service tool 20 may be operatively connected to system controller 18 by any of a wide variety of communication links 32, such as, for example, by a wired link (e.g., via a USB cable) or a by wireless link (e.g., via a Bluetooth® link). Service tool 20 may be used to upload and download data to and from the system controller 18 and also to reprogram or reconfigure the software provided therein.

Figure 3:
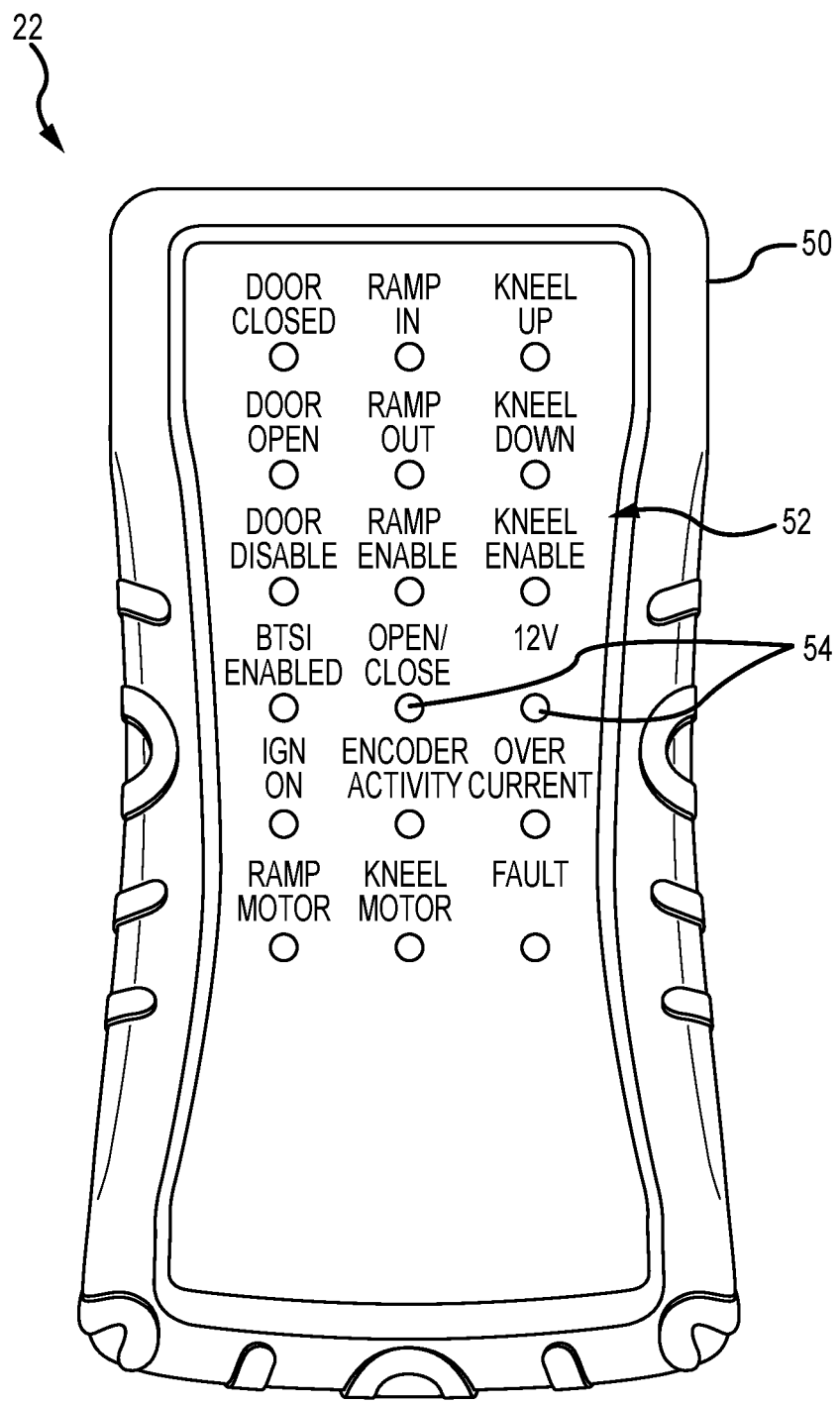
FIG. 3 is a pictorial representation of one embodiment of the diagnostics controller illustrated in FIG. 1.
Figure 4:
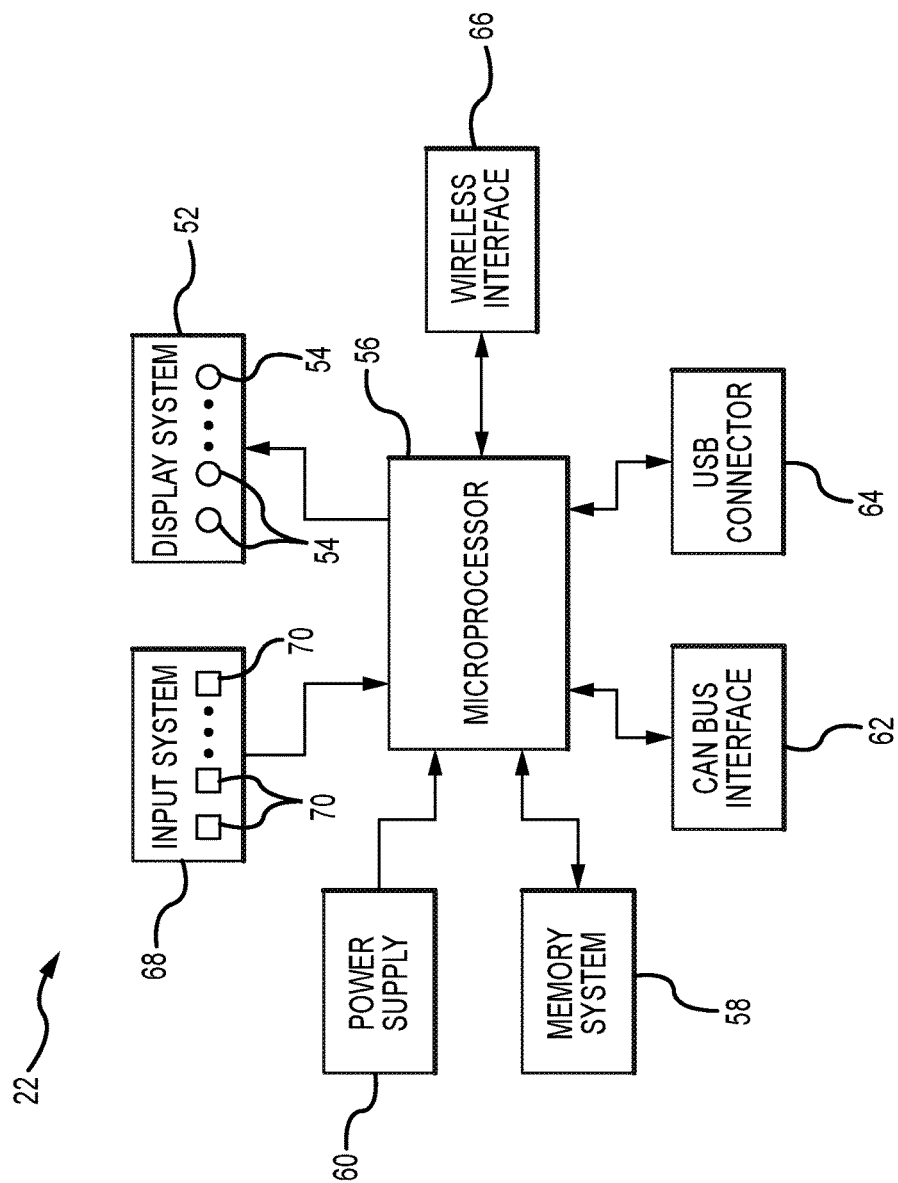
FIG. 4 is a schematic block diagram of the diagnostics controller depicted in FIG. 3.

Vehicle ramp control system 10 may also comprise diagnostic tool 22, as best seen in FIGS. 3 and 4. Like the service tool 20, the diagnostic tool 22 may be operatively connected to the system controller 18 from time-to-time, but instead to allow certain diagnostic functions to be performed. In one embodiment, the diagnostic tool 22 may comprise a hand-held device to allow the diagnostic tool 22 to provide for the convenient and portable access to vehicle 12. Like the service tool 20, the diagnostic tool 22 may be operatively connected to the system controller 18 by a wired or wireless communication link 34.

Vehicle ramp control system 10 may also comprise preventative maintenance indicator 30. Preventative maintenance indicator 30 is operatively connected to the system controller 18 and may be mounted to the vehicle 12 at any convenient location, such as on the vehicle dashboard (not shown). The system controller 18 may be programmed to illuminate the preventative maintenance indicator 30 when preventative maintenance needs to be performed on the power ramp system 14.

The vehicle ramp control system 10 may be programmed or configured to provide for the integrated control of the power ramp system 14 and vehicle control system 16. For example, in one embodiment, the system controller 18 may be programmed or configured to coordinate operation with the vehicle control system 16 so that when a vehicle operator activates a power sliding door switch (not shown), a sequence of events will be initiated to open the sliding door, lower the suspension (e.g., via the power kneel system 24, if provided), and deploy the vehicle ramp 36 (e.g., via the power ramp system 14), all without additional input or commands from the vehicle operator. Similarly, subsequent activation of the power door sliding switch (e.g., to close the door) will initiate a sequence of events that will retract the vehicle ramp 36, raise the vehicle suspension to the normal operating height, and close the vehicle door, again all without requiring additional input or commands.

A significant advantage of the vehicle ramp control system 10 is that it may be used to provide for the enhanced control and integration of various components of a power ramp system and an OEM vehicle control system. For example, in one embodiment, the system controller 18 may be programmed or configured to coordinate operation with the vehicle control system 16 so that when a vehicle operator activates a power sliding door switch, a sequence of events will be initiated to open the sliding door, lower the suspension, e.g., via the power kneel system, and deploy the vehicle ramp, all without the need for additional input or commands from the vehicle operator. Similarly, subsequent activation of the power door sliding switch, e.g., to close the door, will initiate a sequence of events that will retract the vehicle ramp, raise the vehicle suspension to the normal operating height, and close the vehicle door, again all without requiring additional input or commands.

Still other advantages are associated with the service tool. For example, using the service tool a service technician can look up not only information relating to certain mechanical parameters and states of the power ramp system, such as the position of the ramp and whether the ramp is in the deployed or retracted positions, but also additional information, such as the motor current history for the motors associated with the power ramp and power kneel systems. Not only can the service tool 20 access this information, but the information can be recorded, saved, and printed, as mentioned above.

Additional advantages are associated with the preventative maintenance indicator. For example, the preventative maintenance indicator provides a convenient means to alert the vehicle operator when it is time to bring the vehicle in for service, thereby forestalling potentially expensive malfunctions before they occur. In addition, the data storage and retrieval options allow service technicians to quickly diagnose and repair any potential malfunctions as well as save any maintenance or service notes in the vehicle ramp control system memory for future reference.

Having briefly described one embodiment of the vehicle ramp control system 10, as well as some of its more significant features and advantages, various embodiments and alternative configurations of the vehicle ramp control system will now be described in detail. However, before proceeding with the description, it should be noted that the various embodiments of the invention are shown and described herein as they could be implemented on a mini-van type of vehicle of the type commonly modified with power deployable ramp systems. However, it should be understood that the present invention could be implemental or practiced on other types of vehicles that are now known in the art or that may be developed in the future that may be provided with power deployable ramp systems. Consequently, the present invention should not be regarded as limited to the particular devices, systems, and applications shown and described herein.

Referring back now primarily to FIGS. 1 and 2, the vehicle ramp control system 10 may comprise system controller 18, service tool 20, diagnostic tool 22, and preventative maintenance indicator 30. The system controller 18 may be operatively connected to the power ramp system 14 and, optionally, to a power kneel system 24 that may be provided on vehicle 12. System controller 18 may also be operatively connected to the vehicle control system 16.

As mentioned earlier, vehicle control system 16 may comprise an OEM component of vehicle 12 and may be used to control a wide range of vehicle systems and devices provided by the vehicle manufacturer. For example, vehicle control system 16 may be operatively associated with one or more sliding door systems 26 to actuate respective sliding doors (not shown) provided on vehicle 12. Vehicle control system 16 allows a vehicle operator (not shown) to control the sliding door system 26, either directly (e.g., via suitable control switches provided on the vehicle 12), or wirelessly (e.g., via a key fob). In this regard it should be noted that the present invention should not be regarded as limited to vehicles having sliding doors and/or power sliding door systems, but could be used on other vehicle types having other types of door systems. Vehicle control system 16 also may be operatively associated with a wide range of other vehicle systems and devices 28, such as engine control systems, transmission sensing/control systems, braking systems, door lock systems, and lighting systems, just to name a few.

Figure 2:
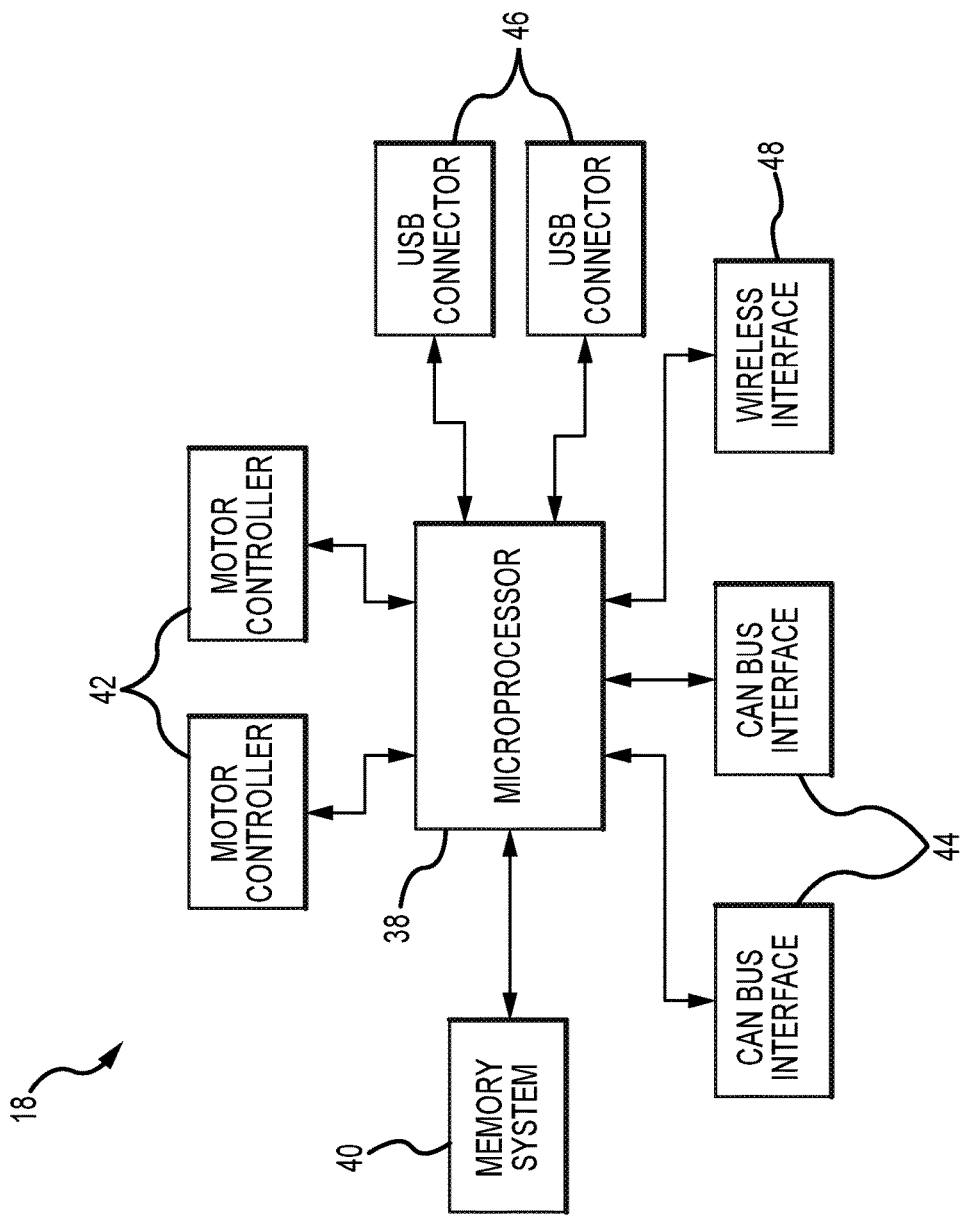
FIG. 2 is a schematic block diagram of one embodiment of the system controller illustrated in FIG. 1.

Referring now specifically to FIG. 2, in one embodiment system controller 18 may comprise a microprocessor 38 and associated memory system 40 to allow microprocessor 38 to be programmed or configured to perform the various functions and operations described herein. Microprocessor 38 may also be operatively connected to one or more motor controllers 42. Motor controllers 42 allow microprocessor 38 to control various motors (not shown) that may be associated with the various systems and devices connected to system controller 18, such as motors associated with the power ramp system 14 and power kneel system 24. System controller 18 may also comprise one or more CAN bus interfaces 44 and one or more USB connectors 46 operatively connected to microprocessor 38. The CAN bus interfaces 44 permit the system controller 18 to interface with the communications access network (CAN) of vehicle 16, whereas USB connectors 46 permit the system controller 18 to be operatively connected to service tool 20 and diagnostic tool 22. In some embodiments, system controller 18 may also be provided with a wireless interface system 48, such as a Bluetooth interface, to allow the system controller 18 to be operatively connected to the service and diagnostic tools 20 and 22.

The various hardware components of system controller 18, such as microprocessor 38, motor controllers 40, memory system 42, and interfaces 44, 46, and 48, may comprise any of a wide range of devices now known in the art or that may become available in the future that are, or would be, suitable for the intended application. Consequently, the present invention should not be regarded as limited to any particular type of hardware components. However, by way of example, in one embodiment, microprocessor 38 may comprise a PIC32MX795F512L microcontroller available from Microchip Technology, Inc. of Chandler, Ariz. (US). In one embodiment, the motor controllers 42 may comprise H-bridge motor controllers of the type well-known in the art. Similarly, the CAN, USB, and wireless interfaces 44, 46, and 48, are also well-known in the art and could be readily provided by persons having ordinary skill in the art after having become familiar with the teachings provided herein. Consequently, the various hardware components comprising system controller 18 will not be described in further detail herein.

System controller 18 may be provided with may be provided with a single software or firmware package to allow the system controller 18 to be readily used with a wide variety of vehicles 12 manufactured by a wide variety of manufacturers. For example, the software or firmware package may allow the system controller 18 to read, i.e., via CAN interface 44, certain information about the vehicle 12, including the make, model, and vehicle identification number (VIN). System controller 18 may then use this information to implement or follow the particular program sequence and communication protocols provided in the software package for the particular vehicle 12. The system controller 18 will thus know when and how to deploy the door, ramp, and power kneel systems 26, 14, and 24 for the particular vehicle 12. In other embodiments, the system controller 18 may also be programmed to read (i.e., sense the state of) other vehicle systems 28, such as transmission state (e.g., park/reverse/neutral/drive), door lock state (locked, unlocked, child lock system), engine ignition, braking system, etc., to fully integrate and coordinate the operation of the power ramp system 14 with the vehicle 12.

The system controller 18 software or firmware package may also be programmed to monitor and/or record various data and performance characteristics associated with the vehicle ramp system 14. For example, the software or firmware package may be programmed to count the number of ramp cycles and to illuminate the preventative maintenance indicator 30 when the number of ramp cycles has reached a predetermined limit. The system controller 18 may also be programmed to sense and record certain other parameters and data associated with the vehicle ramp system 14, such as the current used by motors (not shown) associated with the power ramp and kneel systems 14 and 24, as described herein.

As briefly mentioned above, vehicle ramp control system 10 may also comprise service tool 20. Service tool 20 may be operatively connected to the system controller 18 from time-to-time, e.g., via the CAN, USB or wireless interfaces 44, 46, and 48, to allow a service technician (not shown) to access the system controller 18. In one embodiment, service tool 20 may comprise a software program configured to operate on a general purpose programmable computer, such as a laptop PC (not shown). Alternatively, service tool 20 may comprise dedicated or custom system designed specifically for use with the system controller 18. Service tool 20 may be used to upload and download data to and from the system controller 18 and also to reprogram or reconfigure the software provided therein.

For example, in one embodiment the service tool 20 may be used by a service technician to look up or access any of a wide range of information about the vehicle ramp control system 10 stored in the memory 40 of system controller 18, such as, for example, a history or log of motor current for both the power ramp and power kneel systems 14 and 24. Not only can such information be seen via the service tool 20, it can be recorded, saved, and printed in order to evaluate the performance of the respective systems 14 and 24. The service tool 20 may also be used to provide and/or update the system controller 18 with software for performing system diagnostics, control, customer VIN (vehicle identification number), other customer notes, and re-flashing of the various memory systems of system controller 18. Re-flashing may comprise reprogramming the firmware (i.e., software code) that runs the various systems (e.g., sliding doors 26, power ramp system 14, and power kneel system 24) in conjunction with the CAN (communication access network) associated with the OEM vehicle control system 16. Service tool 20 may also enable the service technician to save into the memory system 40 of system controller 18 custom service notes, such as particular details regarding the service history of the vehicle 12 or specific instructions for future service events.

Referring now to FIGS. 3 and 4, vehicle ramp control system 10 may also comprise diagnostic tool 22. Like the service tool 20, the diagnostic tool 22 may be operatively connected to the system controller 18 from time-to-time, but instead to allow certain diagnostic functions to be performed. In one embodiment, the diagnostic tool 22 may comprise a housing 50 sized and shaped for hand-held use. Housing 50 may be provided with a display system 52, such as, for example, a plurality of individual LEDs 54 suitable for providing a visual indication of the status of various systems of the vehicle ramp control system 10 and vehicle 12. For example, in one embodiment, the various LEDs 54 comprising display system 52 may be used to provide the status of the door position (i.e., "door open" or "door closed"), ramp position ("ramp in" or "ramp out"), power kneel system position ("kneel up" or "kneel down"), status of the door, ramp, and power kneel systems (i.e., whether they are enabled or disabled), system voltage and current, encoder activity, ignition status, ramp and kneel motor status, encoder activity, BTSI (brake transmission shift interlock) enabled, and a general fault status. Alternatively, of course, diagnostic tool 22 may provide the status of other systems, either in addition to, or in place of, the various systems shown and described herein.

Referring now to FIG. 4, in one embodiment, diagnostic tool 22 may comprise a microprocessor 56 and associated memory 58 to allow microprocessor 56 to be programmed or configured to perform the various functions and operations described herein. Microprocessor 56 may also be operatively connected to a power supply 60 to allow the diagnostic tool 22 to function regardless of whether it is connected to the vehicle 12. Microprocessor 56, au also be connected to one or more CAN bus interfaces 62 and one or more USB connectors 64. The CAN bus interface 62 allows the diagnostic tool 22 to interface with the CAN of vehicle 16. The USB connector 64 allows the diagnostic tool 22 to be connected to system controller 18. In some embodiments, diagnostic tool 22 may also be provided with a wireless interface system 66, such as a Bluetooth interface, to allow the diagnostic tool 22 to be connected to system controller 18. Diagnostic tool 22 may also be provided with one or more input devices 68, such as selection buttons 70 to allow a service technician to operate diagnostic tool 22. Microprocessor 56 is also operatively connected to the display system 52 of diagnostic tool 52 to provide a visual indication of the status of various systems, as already described.

As was the case for system controller 18, the various hardware components of diagnostic tool 22, such as microprocessor 56, memory system 58, and interfaces 62, 64, and 66, may comprise any of a wide range of devices now known in the art or that may become available in the future that are, or would be, suitable for the intended application. Consequently, the present invention should not be regarded as limited to any particular type of hardware components. However, by way of example, in one embodiment, microprocessor 56 also may comprise a PIC32MX795F512L microcontroller available from Microchip Technology, Inc. of Chandler, Ariz. (US). The CAN, USB, and wireless interfaces 44, 46, and 48, also may comprise the same devices as those used for the system controller 18, although other devices could be used as well.

The diagnostic tool 22 may be provided with suitable firmware or software to allow diagnostic tool 22 to read one or more internal fault codes stored within the system controller 18, to assess the cause of possible system malfunctions or errors, and display such information and data via display system 52, e.g., via the LEDs 54 in the manner already described.

Vehicle ramp control system 10 may also be provided with a preventative maintenance indicator 30. Preventative maintenance indicator 30 may be operatively connected to the system controller 18 and may be mounted to the vehicle 12 at any convenient location, such as on the vehicle dashboard. The system controller 18 may be programmed to illuminate the preventative maintenance indicator 30 when preventative maintenance needs to be performed on the power ramp system 14. When this occurs, a service technician could then use the diagnostic tool 22 to determine the particular preventative maintenance operation that needs to be performed. In some embodiments, the diagnostic tool 22 may be configured to allow the service technician to reset certain maintenance intervals, although this functionality is not required to be provided in diagnostic tool 22.

The various elements of the vehicle ramp control system 10 may be operated to control a wide variety of systems and devices to provide for the convenient control, operation, and maintenance of the power ramp system 14. Primary systems that may be controlled include, but are not limited to, the power sliding door system 26, the power kneel system 24 (if provided), and the power ramp system 14 itself. In addition, the vehicle ramp control system 10 may be programmed or configured to work with other systems 28 of vehicle 12.

Figure 5:
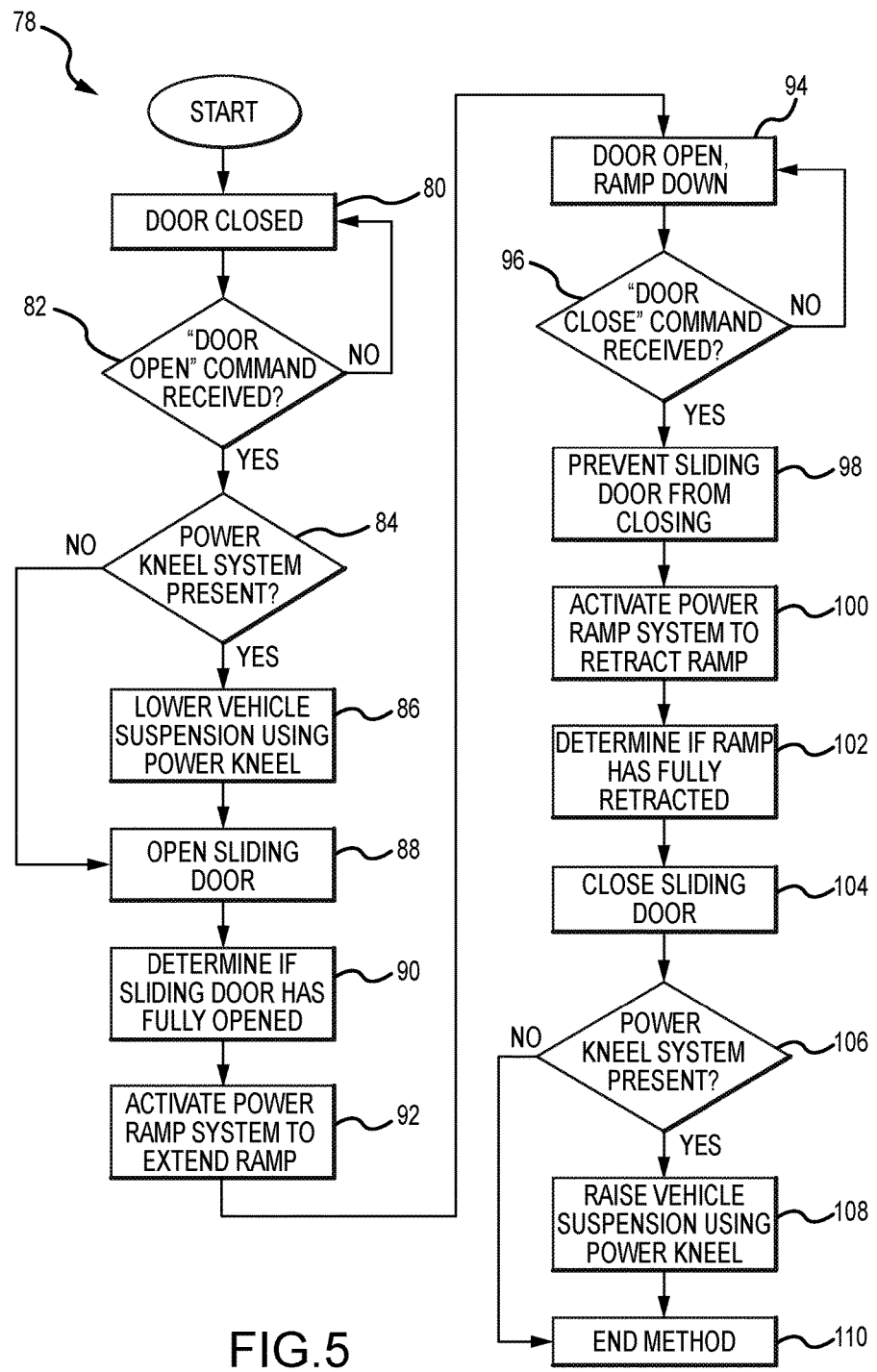
FIG. 5 is a flow chart representation of one embodiment of a method of operating a power ramp system according to the teachings provided herein.

For example, and referring now to FIG. 5, the vehicle ramp control system 10 may be configured or programmed to implement a method 78 to activate and retract the power ramp system 24 and optional power kneel system 24. A first step 80 in method 78 may begin with the vehicle 12 sliding door 27 in the closed position and the vehicle ramp control system 10 inactive. This may occur when the vehicle 12 is powered down and inactive, or may occur when the vehicle is running but with all doors closed. The vehicle operator inputs a "door open" command at step 82.

After receiving the "door open" command at step 82, the vehicle ramp control system 10 system controller 18 may activate and check, at step 84, whether the vehicle 12 contains an optional power kneel system 24. The system controller 18 may make this check by accessing information stored within memory 40 or by accessing information in real-time using CAN bus interface 44 to determine the current configuration of the vehicle 12 and whether it has a power kneel system 24 installed. Alternatively, the software or firmware package of the system controller 18 may detect the presence of the kneel motor control software, and thereby determine that a power kneel system 24 is present.

If the vehicle 12 does not contain such a power kneel system 24, the method may proceed to step 88 and engage the sliding door system 26 of the vehicle 12 to begin opening the vehicle sliding door 27. If the vehicle ramp control system 10 determines at step 84 that the vehicle 12 does have an optional power kneel system 24, the method 78 may first move to step 86, at which step the power kneel system 24 may lower the suspension of the vehicle 12, before proceeding on to step 88.

As the sliding door system 26 begins opening the vehicle sliding door at method step 88, the system controller 18 may periodically check, at method step 90, whether the sliding door 27 has fully opened. The software or firmware package of the system controller 18 may monitor the location of the sliding door continuously using suitable sensors (not shown). Alternatively, the software or firmware package of the system controller 18 may detect the closure of a switch or sensor that indicates the sliding door is fully open and has stopped moving.

Once the system controller 18 determines the sliding door is in the fully open position, the method 78 may proceed to step 92 and activate the power ramp system 14 to extend the ramp 36 from the vehicle 12. As mentioned earlier, method 78 may perform the various steps involved to open the door and deploy the ramp 36 with no further input required from the vehicle operator.

After extending the ramp 36 at step 92, the method may proceed to step 94, with the sliding door 27 of the vehicle 12 open and the ramp 36 down. No further activity will occur until the vehicle operator inputs a "door close" command at step 96. This may be accomplished by pressing a button inside the vehicle 12, pressing a button on the vehicle 12 exterior, or wirelessly via a key fob or other wireless device. Upon receiving the "door close" command, the method 78 may move to step 98, at which step the system controller 18 may prevent the OEM vehicle control system 16 from attempting to prematurely close sliding door until the ramp 36 has been fully retracted. Next, the method 78 may move to step 100, and may activate the power ramp system 14 to retract the vehicle ramp 36. As the vehicle ramp 36 retracts, the method 78 may proceed to step 102, at which step the system controller 18 may monitor the power ramp system 14 to determine when the ramp 36 is fully retracted. System controller 18 may monitor the location of the vehicle ramp 36 continuously during the retraction process or may simply detect when the ramp has reached the fully retracted position.

Once the system controller 18 determines at step 102 that the ramp system 14 has completed retracting the ramp 36, the method 78 may move to step 104 and engage the sliding door system 26 to close the sliding door. Finally, the method 78 may move to step 106, at which step the system controller 18 may again determine whether the vehicle 12 contains an optional power kneel system 24. If the vehicle 12 does not, the method 78 may proceed directly to step 110 and terminate. If the vehicle 12 does contain an optional power kneel system 24, the system controller 18 may first move to step 108 and may engage the power kneel system 24 to raise the suspension of the vehicle 12. Here again, each of these method 78 steps may be carried out automatically, with no further input required from the vehicle operator after receiving the "door close" command at step 96.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A method of operating a power ramp system on a vehicle to deploy and retract a ramp, comprising:
sensing a 'door open' command issued by a vehicle operator;
opening a sliding door on the vehicle in response to the 'door open' command;
determining when the sliding door is in a fully opened position
operating a power kneel system to lower a vehicle suspension system in response to the 'door open' command only after determining that the sliding door is in the fully opened position; and
activating the power ramp system to deploy the ramp when the door is in a fully opened position, said opening, said determining, and said activating occurring without additional commands by the vehicle operator.

2. The method of claim 1, further comprising:
sensing a 'door close' command from a vehicle operator;
preventing the sliding door from closing in response to the 'door close' command;
activating the power ramp system to retract the ramp;
determining when the ramp is in the fully retracted position; and
closing the sliding door on the vehicle only after determining that the ramp is in the fully retracted position, said sensing, preventing, activating, determining, and closing occurring without additional commands by the vehicle operator.

3. The method of claim 2, further comprising activating a power kneel system to lower a rear suspension system on the vehicle after sensing the 'door open' command.

4. The method of claim 3, further comprising activating the power kneel system to raise the rear suspension system on the vehicle after sensing the 'door close' command.

5. A vehicle ramp control system, comprising:
a system controller configured to interface with a power ramp system for a vehicle and also with an OEM vehicle control system associated with the vehicle, said system controller being programmed to operate the power ramp system in conjunction with at least one system controlled by the OEM vehicle control system, wherein said system controller senses current drawn by a motor operatively associated with the power ramp system and stores the sensed motor current for later retrieval; and
a preventative maintenance indicator operatively associated with said system controller, said system controller activating said preventative maintenance indicator when said system controller determines that a preventative maintenance operation is required.

6. The vehicle ramp control system of claim 5, wherein the at least one vehicle system controlled by the OEM vehicle control system comprises a sliding door operating system.

7. The vehicle ramp control system of claim 6, wherein the vehicle is provided with a power kneel suspension control system for raising and lowering a vehicle suspension, and wherein said system controller is programmed to coordinate operation of the power kneel system.

\* \* \* \* \*